(12) United States Patent
Kobayashi

(10) Patent No.: US 11,214,223 B2
(45) Date of Patent: Jan. 4, 2022

(54) SIDE AIRBAG DEVICE

(71) Applicant: Autoliv Development AB, Vargarda (SE)

(72) Inventor: Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/760,975

(22) PCT Filed: Oct. 9, 2018

(86) PCT No.: PCT/JP2018/037528
§ 371 (c)(1),
(2) Date: May 1, 2020

(87) PCT Pub. No.: WO2019/087698
PCT Pub. Date: May 9, 2019

(65) Prior Publication Data
US 2020/0262382 A1 Aug. 20, 2020

(30) Foreign Application Priority Data

Nov. 2, 2017 (JP) .............................. JP2017-212627

(51) Int. Cl.
*B60R 21/231* (2011.01)
*B60R 21/207* (2006.01)
(Continued)

(52) U.S. Cl.
CPC ...... *B60R 21/23138* (2013.01); *B60R 21/207* (2013.01); *B60R 21/217* (2013.01);
(Continued)

(58) Field of Classification Search
None
See application file for complete search history.

(56) References Cited

U.S. PATENT DOCUMENTS 9,592,789 B2 * 3/2017 Fujiwara ................. B60R 21/26
9,862,345 B2 * 1/2018 Ohno ..................... B60R 21/276
(Continued)

FOREIGN PATENT DOCUMENTS

GB  2397047 A    7/2004
JP  2003104155 A * 4/2003
(Continued)

OTHER PUBLICATIONS

International Search Report of the International Searching Authority for PCT/JP2018/037528 dated Dec. 18, 2018.
(Continued)

*Primary Examiner* — Faye M Fleming
(74) *Attorney, Agent, or Firm* — Harness, Dickey & Pierce, P.L.C.; Stephen T. Olson

(57) ABSTRACT

[Problem] To provide a side airbag apparatus capable of efficiently improving passenger protection performance and passenger restraining force.
[Resolution means] A side airbag apparatus 100 includes: a cushion 108 which is bag shaped, wound, or folded in a storage form; a holding plate 118 with the cushion 108 attached thereto; and an inflator 110 which is embedded in the cushion 108 and attached to a side frame 112 along the side of a seat back 104 of a seat 102 together with the cushion 108 and the holding plate 118.
The holding plate 118 includes: a base part 120 formed between the cushion 108 and the side frame 112; and a side wall part 122 which extends in the front-back direction of the vehicle in front of the side frame 112 in the front-back direction of the vehicle and supports the expanded and deployed cushion 108 from the side.

17 Claims, 9 Drawing Sheets

(51) Int. Cl.
*B60R 21/26* (2011.01)
*B60R 21/217* (2011.01)
*B60R 21/237* (2006.01)

(52) U.S. Cl.
CPC ............ *B60R 21/237* (2013.01); *B60R 21/26* (2013.01); *B60R 2021/23146* (2013.01)

(56) References Cited

U.S. PATENT DOCUMENTS

| | | | |
|---|---|---|---|
| 10,343,638 B2* | 7/2019 | Fukawatase | B60R 21/237 |
| 10,744,970 B2* | 8/2020 | Ohno | B60R 21/215 |
| 2015/0108741 A1 | 4/2015 | Östman et al. | |
| 2017/0225640 A1 | 8/2017 | Ohno | |
| 2019/0217807 A1* | 7/2019 | Kobayashi | B60R 21/233 |
| 2020/0377051 A1* | 12/2020 | Kobayashi | B60R 21/23138 |

FOREIGN PATENT DOCUMENTS

| | | |
|---|---|---|
| JP | 2009-143260 A | 7/2009 |
| JP | 2014-54956 A | 3/2014 |
| JP | 2015-81082 A | 4/2015 |
| JP | 2017-140945 A | 8/2017 |

OTHER PUBLICATIONS

English translation of International Search Report of the International Searching Authority for PCT/JP2018/037528 dated Dec. 18, 2018.

* cited by examiner

A-A (a)

(b)

(c)

A-A

A-A

SIDE AIRBAG DEVICE

TECHNICAL FIELD

The present invention relates to a side airbag apparatus provided in a vehicle seat.

BACKGROUND

Airbag devices have generally become standard equipment in vehicles in recent years. An airbag apparatus is a safety apparatus that is operated in the event of an emergency such as a vehicle collision in order to receive and protect a passenger by inflating and deploying an airbag cushion (hereinafter, also simply referred to as a cushion) with gas pressure.

There are various types of airbag devices depending on the installation site and application. For example, a front airbag apparatus is provided in the center of a steering wheel in order to protect the driver from a collision in the front-back direction. In addition, in order to protect the occupant from an impact in the vehicle width direction due to a side impact collision or the like, a curtain airbag device is provided near the ceiling above the side window and a side airbag device is provided in the side portion of the seat.

Various ideas have been introduced into airbag apparatuses provided by each company in order to improve passenger protection performance. For example, in a side airbag apparatus described in Patent Document 1, an airbag cushion is divided into two parts, that is, a main airbag 50 and an auxiliary airbag 60, with the auxiliary airbag 60 configured so as to be first expanded. Patent Document 1 describes that when the auxiliary airbag 60 moves a passenger to the inside of the vehicle to a certain degree, the space into which the main airbag 50 is expanded can be ensured so as to improve the reliable expansion and protection performance of the main airbag 50.

RELATED ART DOCUMENTS

Patent Documents

Patent Document 1: JP 2009-023494 A

SUMMARY OF THE INVENTION

Problem to be Solved by the Invention

Even now, side airbag apparatuses are required to improve the passenger protection performance and passenger restraining force of an airbag cushion. In order to improve the passenger protection performance, etc., for example, measures such as ensuring a part which provides some support to the airbag cushion can be exemplified. Unfortunately, as illustrated in FIG. 4, etc. in Patent Document 1, an airbag cushion of a side airbag apparatus is provided at the end of the seat back of a vehicle, often with only soft members such as urethane materials present on the side opposite the passenger.

The present invention has been created in view of the abovementioned problem, and an object thereof is to provide a side airbag apparatus capable of efficiently improving passenger protection performance and passenger restraining force.

Means for Solving the Problem

In order to solve the abovementioned problem, in a typical configuration, a side airbag apparatus according to the present invention includes: an airbag cushion which is bag shaped, wound, or folded in a storage form; a predetermined holding plate with the airbag cushion attached thereto; and an inflator which is embedded in the airbag cushion and attached to a side frame along the side of the seat back of a vehicle seat together with this airbag cushion and the holding plate. Herein, the holding plate includes: a base part formed between the airbag cushion and the side frame; and a side wall part which extends in the front-back direction of the vehicle in front of the side frame in the front-back direction of the vehicle and supports the expanded and deployed airbag cushion from the side.

Because the side wall part of the holding plate supports the airbag cushion from the side, the abovementioned configuration can apply reaction force to the airbag cushion, more smoothly expand and deploy the airbag cushion, and improve passenger protection performance.

The side wall part may linearly extend from the base part.

The abovementioned configuration enables the side wall part of the holding plate to support the airbag cushion from the side.

The side wall part may be disposed opposite the inflator in the left-right direction of the vehicle seat to the side frame, with the holding plate further including a rear wall part that is disposed in front of the side frame, extends from the base part to the rear end of the side wall part, and supports the expanded and deployed airbag cushion from the rear side of the vehicle.

The abovementioned configuration enables the airbag cushion to support the rear wall part when the airbag cushion is expanded and deployed to the front, making it possible to smoothly expand and deploy the airbag cushion and improve the passenger protection performance of the airbag cushion.

When this side airbag apparatus is viewed from above, an angle with the rear wall part and the base part sandwiching the side frame may be 90° or more.

The abovementioned rear wall part can efficiently apply forward reaction force on the airbag cushion.

When this side airbag apparatus is viewed from above, the front edge of the side frame may be bent on the inflator side, with the base part capable of being bent so as to surmount the front edge of the side frame and connect to the rear wall part.

The abovementioned configuration allows the holding plate to engage with the front edge of the side frame, making it possible to suitably maintain the arrangement of the holding plate. Consequently, the side wall part and rear wall part of the holding plate, etc. can also more efficiently support the airbag cushion.

The inflator may be attached to the passenger side of the side frame together with the airbag cushion and the holding plate.

The abovementioned configuration enables the side airbag apparatus with improved passenger protection performance, etc. to be suitably implemented.

The inflator may be attached to the side opposite the passenger of the side frame together with the airbag cushion and the holding plate.

The abovementioned configuration enables the side airbag apparatus with improved passenger protection performance, etc. to be suitably implemented.

The holding plate may include a part formed of resin. Moreover, the holding plate may include a part formed of metal.

Each of the abovementioned configurations can suitably embody a holding plate having moderate rigidity.

The side airbag apparatus may further include a cover which releasably covers at least a portion of the airbag cushion in storage form and is formed of a heat welding cloth.

The abovementioned cover enables the airbag cushion to be efficiently held in storage form.

The holding plate may have dimensions larger than that of the airbag cushion in storage form in the vertical direction.

The holding plate having the abovementioned configuration can efficiently support the airbag cushion from the beginning of expansion and deployment.

Effects of the Invention

The present invention enables a side airbag apparatus to be provided which is capable of efficiently improving passenger protection performance and passenger restraining force.

REFERENCE NUMERALS

100 . . . Side airbag apparatus, 102 . . . Seat, 104 . . . Seat back, 106 . . . Seat frame, 108 . . . Cushion, 108a . . . Pre-push chamber, 108b . . . Main chamber, 110 . . . Inflator, 112 . . . Side frame, 114a . . . Upper stud bolt, 114b . . . Lower stud bolt, 116 . . . Cover, 118 . . . Holding plate, 120 . . . Base part of the holding plate, 122 . . . Side wall part of the holding plate, 124 . . . Rear wall part of the holding plate, 126 . . . Front edge of the side frame, 128 . . . Front end part of the base part, 130 . . . Airbag module, 132a . . . Front end part of the cover, 132b . . . Rear end part of the cover, 133 . . . Rib, 134 . . . Holding plate, 138 . . . Airbag module, 140 . . . Side frame, 142 . . . Holding plate, 144 . . . Airbag module, 146 . . . Seat pad, H1 . . . Vertical dimension of the holding plate, H2 . . . Vertical dimension of the cushion in storage form, α1 . . . Angle of the rear wall part to the base part, 200 . . . Side airbag apparatus according to Embodiment 2, 202 . . . Cushion, 204 . . . Holding plate, 206 . . . Inflator, 208 . . . Base part of the holding plate, 210 . . . Side wall part of the holding plate, 212 . . . Rear wall part of the holding plate, α2 . . . Angle of the rear wall part to the base part, 300 . . . Side airbag apparatus according to Embodiment 3, 302 . . . Holding plate, 304 . . . Side wall part, 306 . . . Base part, 308 . . . Side frame

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols in order to omit redundant descriptions along with the illustration of elements not directly related to the present invention.

Embodiment 1

Figure 1:
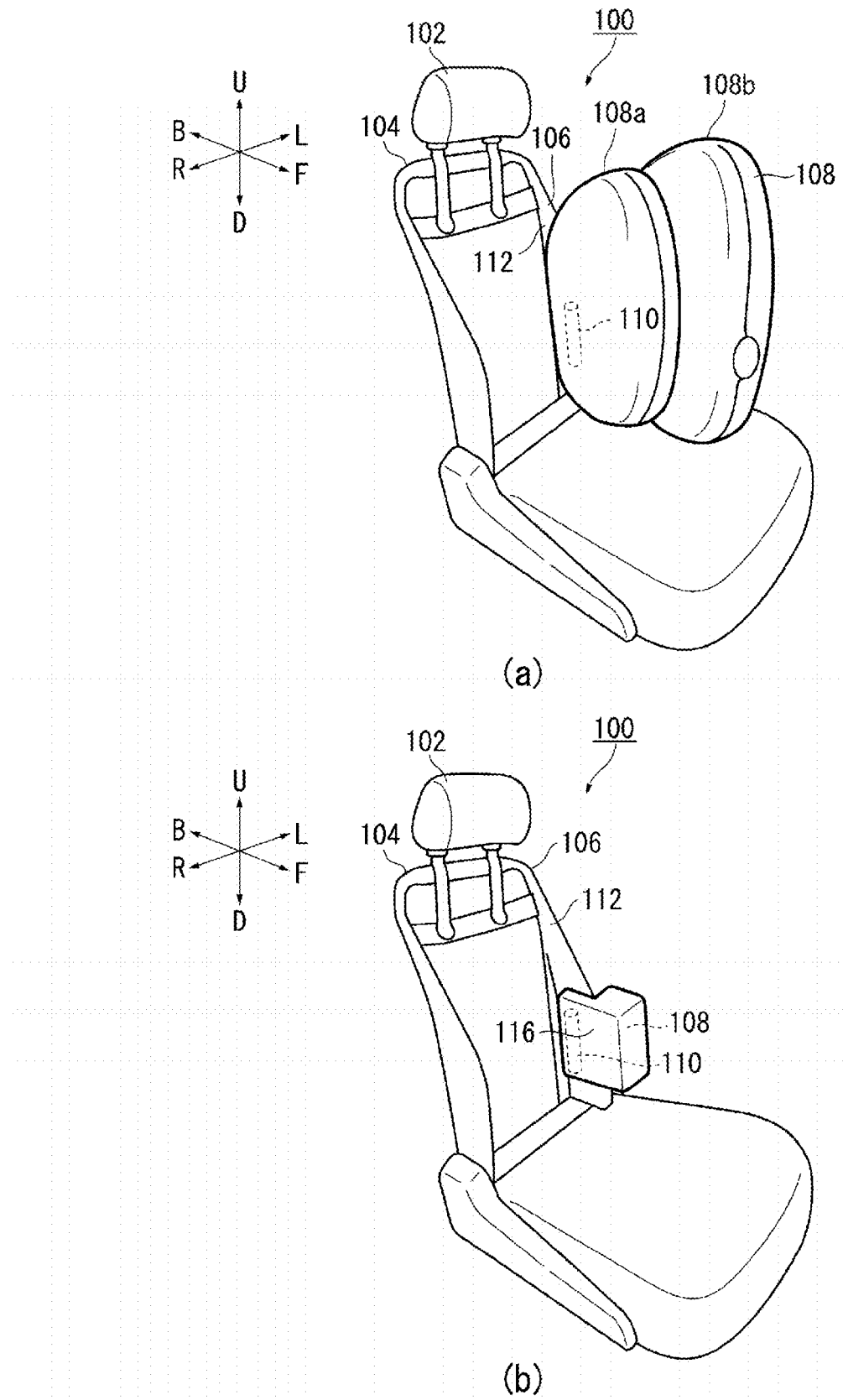
FIG. 1 is a view illustrating an example of a side airbag apparatus according to Embodiment 1 of the present invention.

FIG. 1 is a view illustrating an example of a side airbag apparatus according to Embodiment 1 of the present invention. FIG. 1(a) illustrates, from the diagonal upper right, a side airbag apparatus 100, along with a vehicle seat (seat 102) with this side airbag apparatus 100 applied thereto.

In the present application, in FIG. 1(a) and all other drawings, the front-back direction (when viewed from a passenger who is seated in the seat 102 in a regular position) is illustrated with respective arrows F (forward) and B (back), the left and right (when viewed from the passenger) are illustrated by respective arrows L (left) and R (right), and the vertical direction (when viewed from the passenger) is illustrated by respective arrows U (up) and D (down). For example, in the present embodiment, because an airbag cushion (cushion 108) is expanded and deployed on the left side of the passenger in the regular seating position, the passenger side of the cushion 108 refers to the right side of the cushion 108. Note that, because the orientation of the seat 102 can be changed in the vehicle, the front-back and left-right directions based on the seat 102 are not necessarily congruent with the front-back and left-right directions based on the vehicle.

FIG. 1(a) only illustrates a seat frame 106 in the seat back 104 of the seat 102 with a skin and a seat pad (for example, a urethane material) omitted. The seat frame 106 is a member serving as the skeleton embedded in the seat back 104.

The cushion 108 is a bag shaped part that receives a passenger during an emergency such as when an impact occurs on the vehicle or the like. In the present embodiment, the cushion 108 is attached to the side (passenger side) of a side frame 112 along the side of the seat back 104 in the seat frame 106 and embedded in the seat back 104. The cushion 108 receives gas from an inflator 110 and is expanded and deployed towards the side of the passenger (not illustrated) seated in the seat 102.

The cushion 108 is divided into two chambers, that is, a basic pre-push chamber 108 on the passenger side and a main chamber 108b opposite the passenger. The pre-push chamber 108a is the part which first receives the gas from the inflator 110 and is rapidly expanded and deployed to push the passenger back to the central side of the seat 102. The main chamber 108b is widely expanded and deployed to the space (which is ensured when the pre-push chamber 108a pushes the passenger), more sufficiently restraining the passenger from the side.

The cushion 108 is formed into a bag shape by overlapping, sewing, or adhering multiple base cloths (configuring the surface thereof) or by overlapping or forming by spinning and weaving using an OPW (One-Piece Woven), etc.

The inflator 110 is a gas generator, which receives an operation signal transmitted from the vehicle side when an impact occurs and is operated to supply gas inside the cushion 108. The inflator 110 employed in the present embodiment is a cylinder type (tube type) and embedded on the rear side inside the cushion 108 such that the longitudinal direction is directed in the vertical direction. Stud bolts 114a, 114b (see FIG. 2(a)) are provided in the inflator 110. The stud bolts 114a, 114b extend from the inflator 110 and penetrate through the cushion 108 and the below-mentioned holding plate 118 so as to be fastened to the side frame 112.

Exemplary currently prevailing inflators include: a type which is filled with a gas generating agent and burns the agent to generate gas; a type which is filled with compressed gas and supplies gas without generating heat; or a hybrid type which utilizes both combustion gas and compressed gas; etc. Any type of inflator 110 can be used.

FIG. 1(b) is a view illustrating the state when the cushion 108 in FIG. 1(a) is stored. As illustrated in FIG. 1(b), the cushion 108 is reduced (while being wound and folded) to be formed into a storage form, then attached on the passenger side of the side frame 112 together with the holding plate 118 (see FIG. 3) and the inflator 110.

The surface of the cushion 108 in storage form is covered with a cover 116 coupled to the holding plate 118. In the present embodiment, the holding plate 118 is formed of resin, while the cover 116 is formed of a heat welding cloth. When subjected to a predetermined pressure and heat, the heat welding cloth is welded, compressed, and hardened. When heat welded, the cover 116 maintains the storage form of the cushion 108 together with the holding plate 118. The cover 116 has a predetermined fragile part (not illustrated) such as a region heat welded to the holding plate 118, a slit, or a notch. The cover 116 releases the cushion 108 when the fragile part breaks at the expansion pressure of the cushion 108. Note that such a cover 116 can be formed of the same material as the base cloth of the cushion 108, along with an unwoven fabric, etc. in addition to the heat welding cloth. Moreover, the cover 116 covers the overall cushion 108, but can hold the cushion 108 even in the configuration covering only the range of a predetermined portion.

Figure 2:
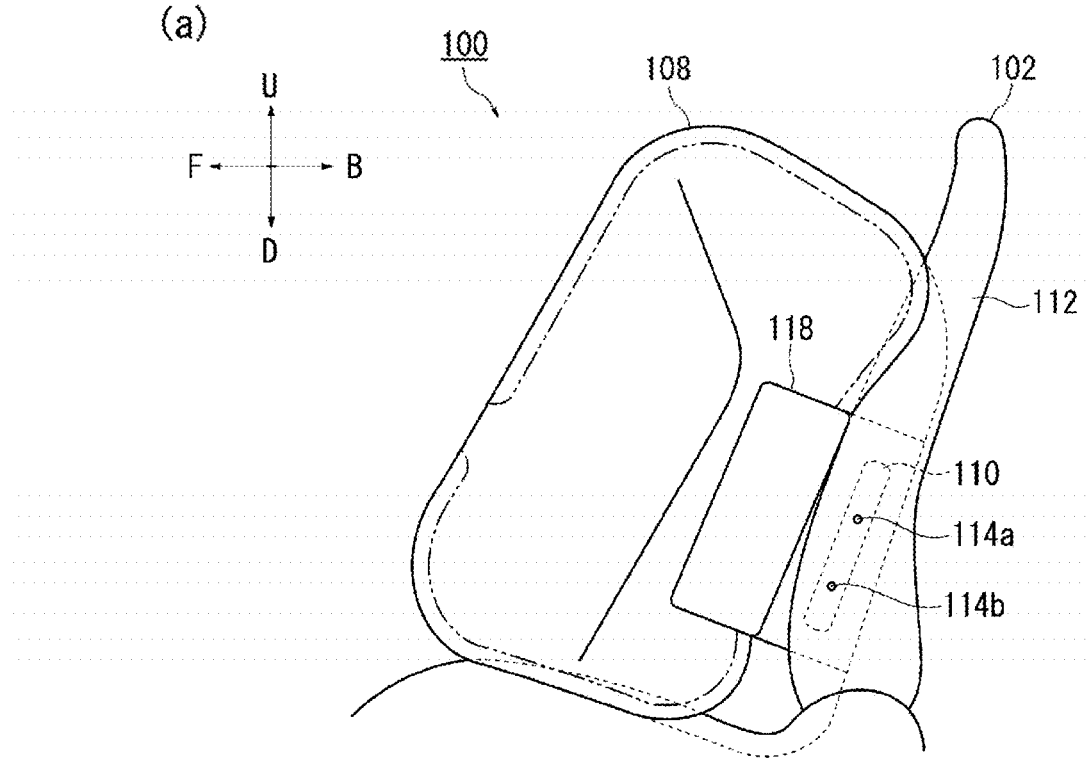
FIG. 2 is a view illustrating a cushion in each state in FIG. 1 when viewed from the side of a vehicle seat.
Figure 2:
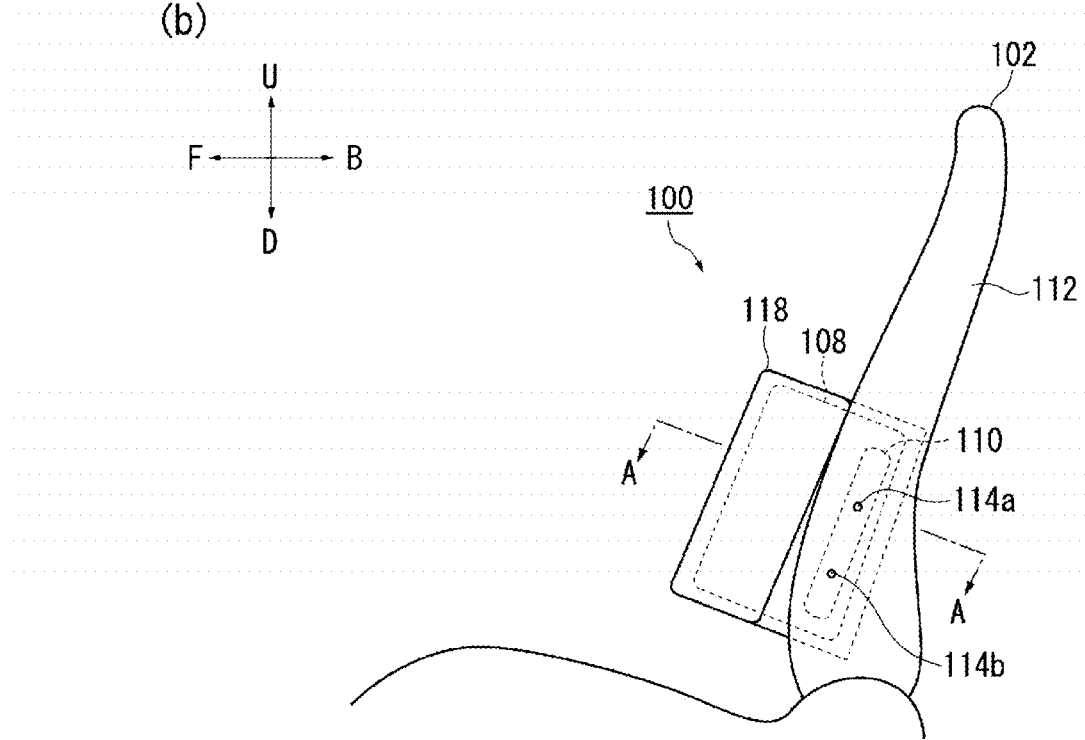

FIG. 2 is a view illustrating the cushion 108 in each state in FIG. 1 from the side of a vehicle seat (seat 102). FIG. 2(a) illustrates the cushion 108 after being expanded and deployed in FIG. 1(a). As illustrated in FIG. 2(a), the cushion 108 according to the present embodiment is attached to the side frame 112 utilizing the stud bolts 114a, 114b of the inflator 110 stored on the rear side there inside so as to be expanded and deployed in front of the side frame 112.

FIG. 2(b) illustrates the cushion 108 in storage form in FIG. 1(b). In the present embodiment, the cushion 108 is attached to the holding plate 118. The holding plate 118 is a component which has a certain degree of rigidity and supports the cushion 108 when the cushion 108 is expanded and deployed. In the present embodiment, the material of the holding plate 118 is configured to include a part formed of resin. As another configuration example, the material of the holding plate 118 may include a part formed of metal. Any material can suitably embody the holding plate 118 having moderate rigidity.

Figure 3:
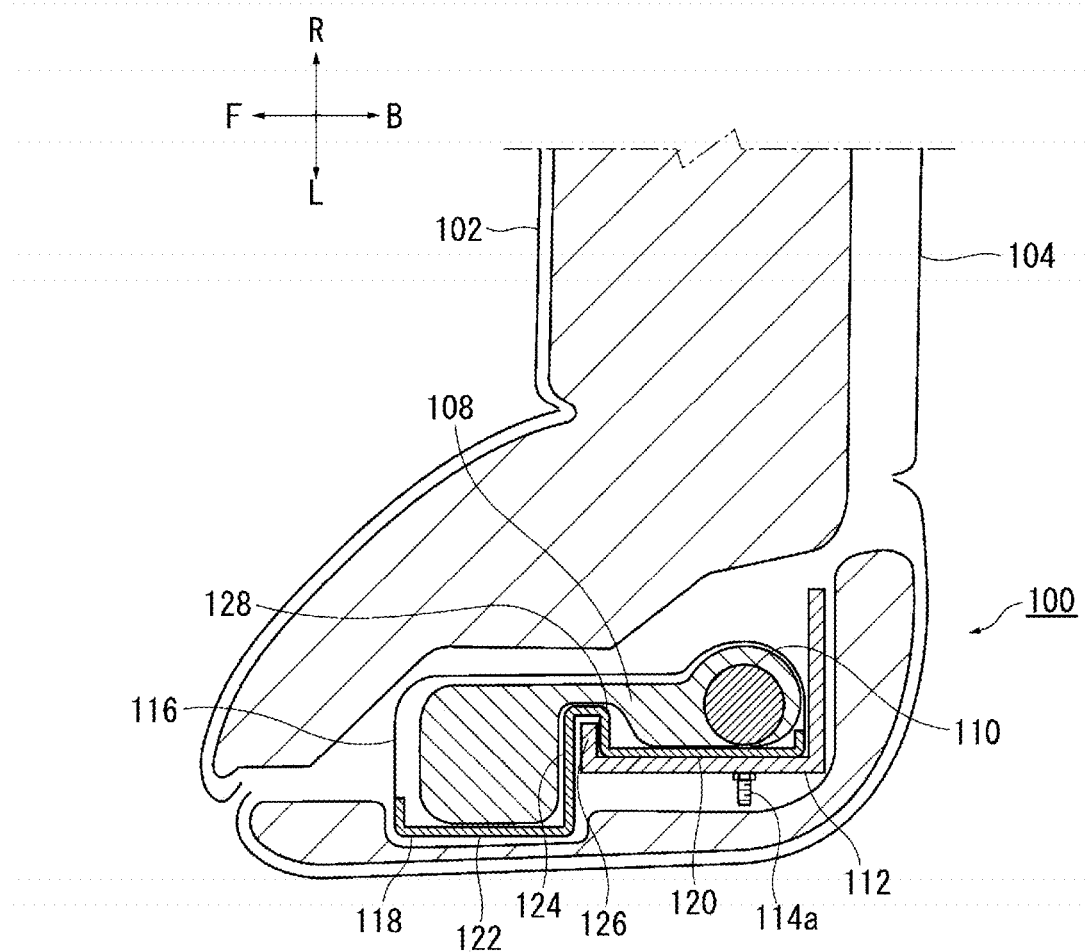
FIG. 3 is a cross sectional view of the cushion in the storage state in FIG. 2(b) taken along line A-A.

FIG. 3 is a cross sectional view of the cushion 108 in the storage state in FIG. 2(b) taken along line A-A. As illustrated in FIG. 3, the holding plate 118 also utilizes the stud bolt 114a of the inflator 110 so as to be attached to the passenger side of the side frame 112 together with the cushion 108. The abovementioned cover 116, together with the holding plate 118, covers the cushion 108 in storage form.

Each part of the holding plate 118 will be described. A base part 120 is a part which is formed between the cushion 108 and the side frame 112, and formed along the side of the side frame 112 on the passenger side in the present embodiment. A stud bolt 114a of the inflator 110 penetrates through the base part 120 and is fastened and fixed to the side frame 112 so as to be sandwiched between the inflator 110 and the side frame 112 together with the cushion 108.

A side wall part 122 is a part which extends in the front-back direction of the vehicle of the seat 102 in front of the front edge 126 of the side frame 112 in the front-back direction of the vehicle. The side wall part 122 is disposed on the side opposite the inflator 110 (the side opposite the passenger) (to the side frame 112 in the left-right direction of the seat 102), supports the expanded and deployed cushion 108 from the side opposite the passenger, and increases the passenger restraining force of the cushion 108.

A rear wall part 124 is a part which is disposed in front of the side frame 112 so as to extend from the base part 120 towards the rear end of the side wall part 122 in the left-right direction of the seat 102. The rear wall part 124 functions to support the cushion 108 from the rear side of the vehicle (when the cushion 108 is expanded and deployed) and rapidly and smoothly expand and deploy the cushion 202.

The holding plate 118 is formed from the base part 120 to the rear wall part 124 so as to engage with the shape on the front side of the vehicle of the side frame 112. For example, when a side airbag apparatus 100 is viewed from above, the front edge 126 of the side frame 112 is bent on the inflator 110 side (passenger side in the present embodiment). The front end part 128 of the base part 120 of the holding plate 118 is temporarily bent on the passenger side along the rear side of the front edge 126 of the side frame 112 and further bent on the front side of the vehicle so as to surmount this front edge 126 and connect to the rear wall part 124. Consequently, a recessed region is formed along the front edge 126 of the side frame 112 from the base part 120 to the rear wall part 124.

Figure 4:
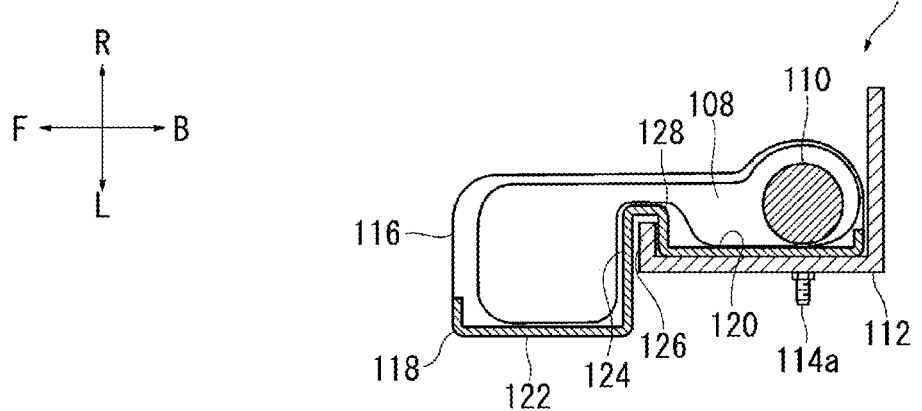
FIG. 4 is a view illustrating the process by which the cushion in FIG. 3 is expanded and deployed.
Figure 4:
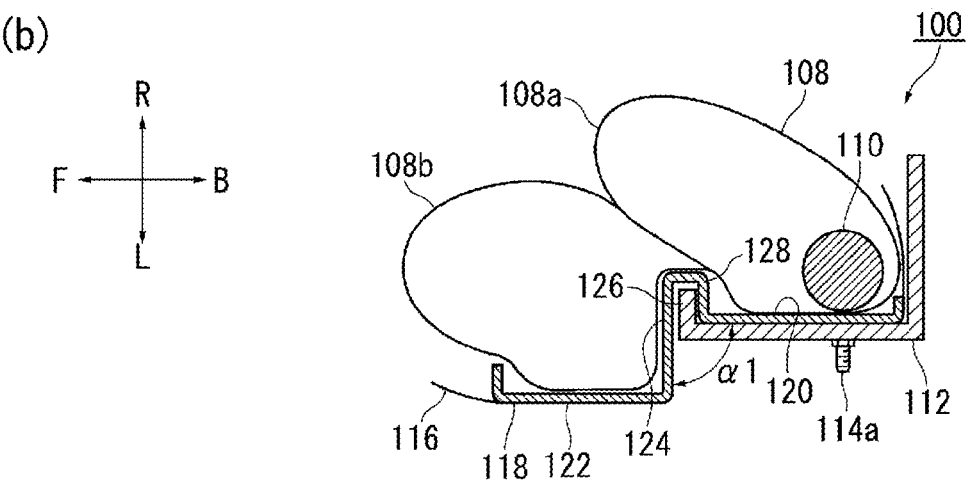
Figure 4:
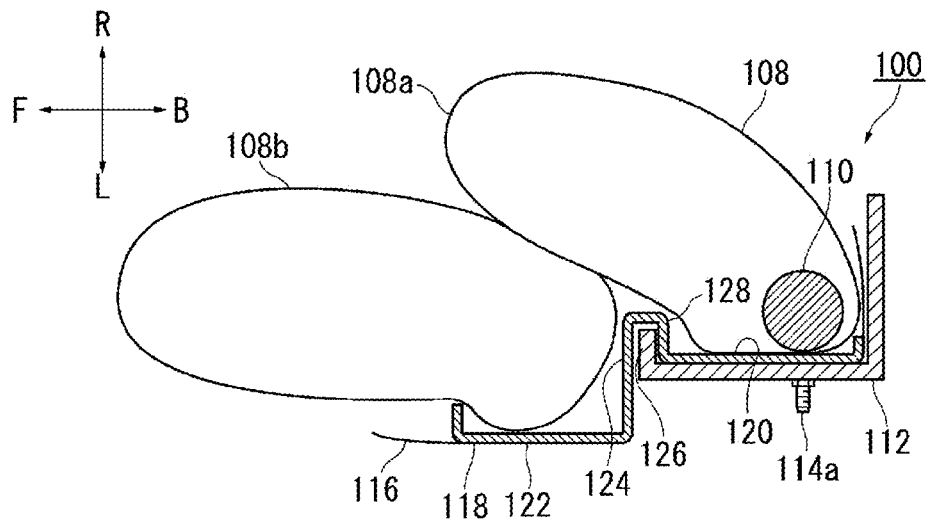

FIG. 4 is a view illustrating the process by which the cushion 108 in FIG. 3 is expanded and deployed. FIG. 4(a) illustrates the cushion 108 in storage form in FIG. 3. When an impact occurs on the vehicle in the state of FIG. 4(a), a predetermined sensor detects this impact and transmits an operation signal to the inflator 110, after which the inflator 110 is operated to supply the gas to the cushion.

FIG. 4(b) illustrates a state immediately after the inflator 110 in FIG. 4(a) is operated. As illustrated in FIG. 4(b), when the gas is supplied from the inflator 110, the cushion first starts to be expanded from a pre-push chamber 108a. The expansion pressure at this time allows the cover 116 to break at a predetermined fragile part (not illustrated) such as a slit or a notch, releasing the cushion 108 from the cover 116. In addition, a main chamber 108b also receives the gas from the pre-push chamber 108a so as to be expanded and deployed following this pre-push chamber 108a.

The rear wall part 124 is in surface contact with the rear of the expanded and deployed main chamber 108b so as to support the main chamber 108b from the rear. The side wall part 122 is in surface contact with the side opposite the passenger of the expanded and deployed main chamber 108b in the front-back direction so as to support the main chamber 108b from the side. When the main chamber 108b incurs reaction force from the rear wall part 124 and the side wall part 122, the main chamber 108b can be rapidly and smoothly expanded and deployed to the front of the seat 102.

FIG. 4(c) illustrates a state in which the cushion 108 in FIG. 4(b) is further expanded and deployed. The passenger contacts the expanded and deployed cushion 108 from the side. At this time, the side wall part 122 of the holding plate 118 is present on the side opposite the passenger in the main chamber 108b. Consequently, the main chamber 108b can incur reaction force from the side wall part 122, suitably absorb a load from the passenger, and more sufficiently restrain the passenger.

As mentioned above, according to the present embodiment, when the holding plate 118, specifically the side wall part 122, supports the main chamber 108b of the cushion 108 from the side, the passenger restraining force of the main chamber 108b can be efficiently improved. Moreover, while the cushion is expanded and deployed, the main chamber 108b to be expanded and deployed to the front is supported from the rear side of the vehicle by the rear wall part 124, allowing the cushion 108 to be smoothly expanded and deployed, resulting in the improved passenger protection performance of the cushion 108.

As described above, the holding plate 118 engages with the front edge 126 of the side frame 112 via the recessed region between the base part 120 and the rear wall part 124. This configuration prevents the holding plate 118 from being displaced from the side frame 112, allowing the arrangement of the holding plate 118 to be suitably maintained while the cushion 108 is expanded and deployed. This mode of operation also enables the side wall part 122 and the rear wall part 124 to more efficiently support the main chamber 108b.

In FIG. 4(b), when this side airbag apparatus 100 is viewed from above the seat 102, an angle $\alpha 1$ with the rear wall part 124 and the base part 120 sandwiching the side frame 112 is suitably 90° or more. The rear wall part 124 having this configuration can apply reaction force to the main chamber 108b at an angle towards the front of the seat 102 or an angle slightly towards the side of the front passenger. Consequently, the main chamber 108b can be smoothly expanded and deployed in order to improve passenger protection performance.

Reference is made once again to FIG. 2(b). A dimension H1 of the holding plate 118 in the vertical direction is suitably larger than a dimension H2 of the cushion in storage form in the vertical direction. In particular, it is even better if the side wall part 122 and the rear wall part 124 have larger vertical dimensions than that of the cushion 108 in storage form. The holding plate 118 having this configuration can efficiently support the cushion 108 from the beginning of expansion and deployment.

Embodiment 2

Figure 5:
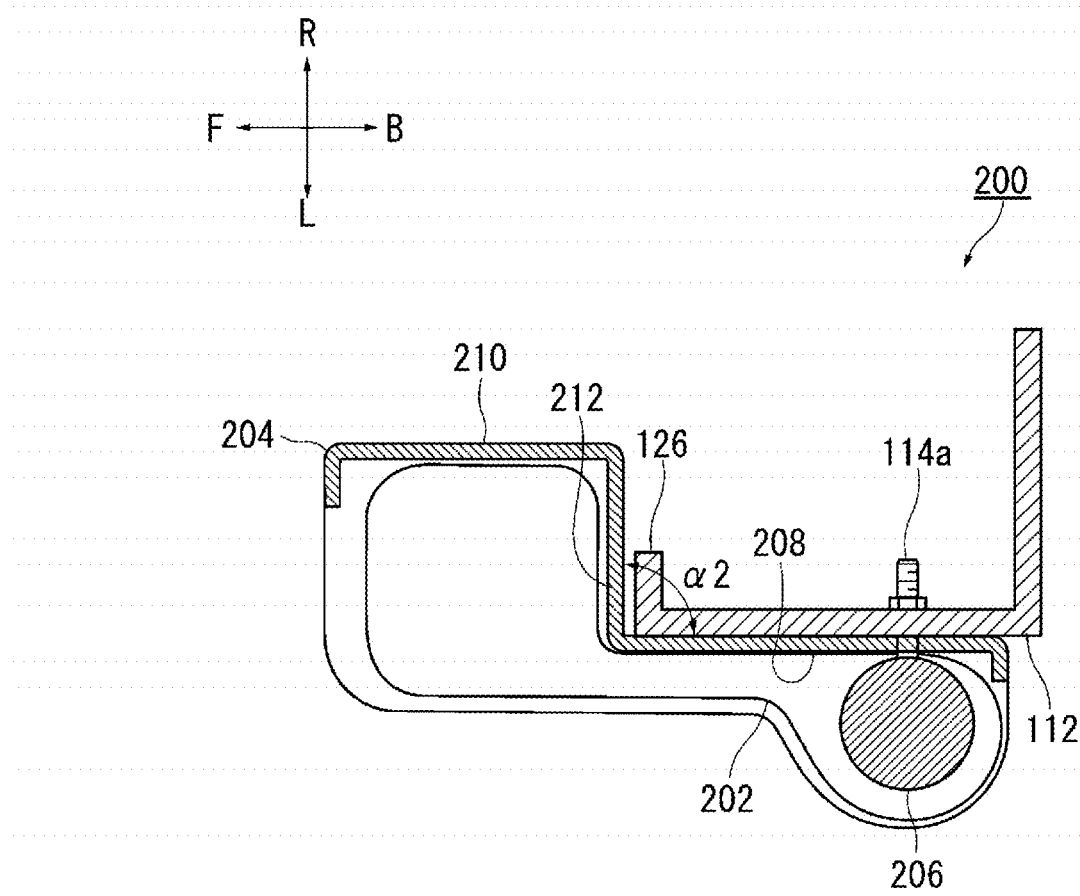
FIG. 5 is a view illustrating an example of a side airbag apparatus according to Embodiment 2 of the present invention.

FIG. 5 is a view illustrating an example of a side airbag apparatus 200 according to Embodiment 2 of the present invention. FIG. 5 illustrates a side airbag apparatus 200 corresponding to FIG. 4(a). In the following description, the same components as described above are labeled using the same symbols, with the descriptions thereof omitted. Moreover, components having the same names as those of the components described above shall have the same configurations and functions even when labeled with different symbols.

The side airbag apparatus 200 is configured to be different from the side airbag apparatus 100 according to Embodiment 1 in FIG. 3, etc. in that an airbag cushion (cushion 202), a holding plate 204, and an inflator 206 are attached to the side opposite a passenger of a side frame 112 in the left-right direction of the seat 102 (see FIG. 3). In particular, the positional relationship of each part of the holding plate 204 to the side frame 112 is different from the holding plate 118 according to Embodiment 1. The cushion 202 and the inflator 206 are configured to be the same as the cushion 108 and the inflator 110 according to Embodiment 1, except that the installation position thereof at the side frame 112 is different, with the detailed descriptions thereof omitted.

Each part of the holding plate 204 will be described. A base part 208 is a part which is formed between the cushion 202 and the side frame 112 and formed along the side opposite the passenger side of the side frame 112 in the present embodiment. A stud bolt 114a of the inflator 206 penetrates through the base part 208 and is fastened and fixed to the side frame 112 so as to be sandwiched between the inflator 206 and the side frame 112 together with the cushion 202.

A side wall part 210 extends in the front-back direction of the seat 102 (see FIG. 3) in front of the front end of the vehicle of the side frame 112. The side wall part 210 is disposed on the side opposite the inflator 206 (when viewed from the side frame 112 in the left-right direction of the seat 102), supports the expanded and deployed cushion 202 from the passenger side, and increases the passenger restraining force of the cushion 202.

A rear wall part 212 is a part which extends from the base part 208 towards the rear end of the side wall part 210 in the left-right direction of the seat 102 (see FIG. 3). The rear wall part 212 functions to support the cushion 202 from the rear side of the vehicle (when the cushion 202 is expanded and deployed) and rapidly and smoothly expand and deploy the cushion 202.

The rear wall part 212 is in surface contact with the rear of the expanded and deployed cushion 202 so as to support the cushion 202 from the rear. The side wall part 210 is in surface contact with the side of the expanded and deployed cushion 202 on the passenger side in the front-back direction so as to support the cushion 202 from the side. When the cushion 202 obtains reaction force from the rear wall part 212 and the side wall part 210, the cushion 202 can be rapidly and smoothly expanded and deployed to the front of the seat 102, resulting in improved passenger protection performance.

Also in the present embodiment, when the holding plate 204 is viewed from above the seat 102 (see FIG. 3), an angle $\alpha 2$ with the rear wall part 212 and the base part 208 sandwiching the side frame 112 is suitably 90° or more. The rear wall part 212 having this configuration can apply reaction force to the cushion 202 at an angle towards the front of the seat 102 or an angle towards the side slightly opposite the front passenger. Consequently, the cushion 202 can be smoothly expanded and deployed in order to improve passenger protection performance.

Moreover, as in the holding plate 118 according to Embodiment 1, if the front edge 126 of the side frame 112 is bent on the inflator 206 side (opposite the passenger), the front end part of the base part 208 of the holding plate 204 may be temporarily bent on the side opposite the passenger along the rear side of the front edge of the side frame 112, then further bent so as to surmount the front edge of the side frame and connect to the rear wall part 212. As a result, the recessed region is formed along the front edge of the side frame 112 from the base part 208 to the rear wall part 212, and the holding plate 204 engages with the front edge of the side frame 112, making it possible to prevent the holding plate 204 from being displaced from the side frame 112.

Embodiment 3

Figure 6:
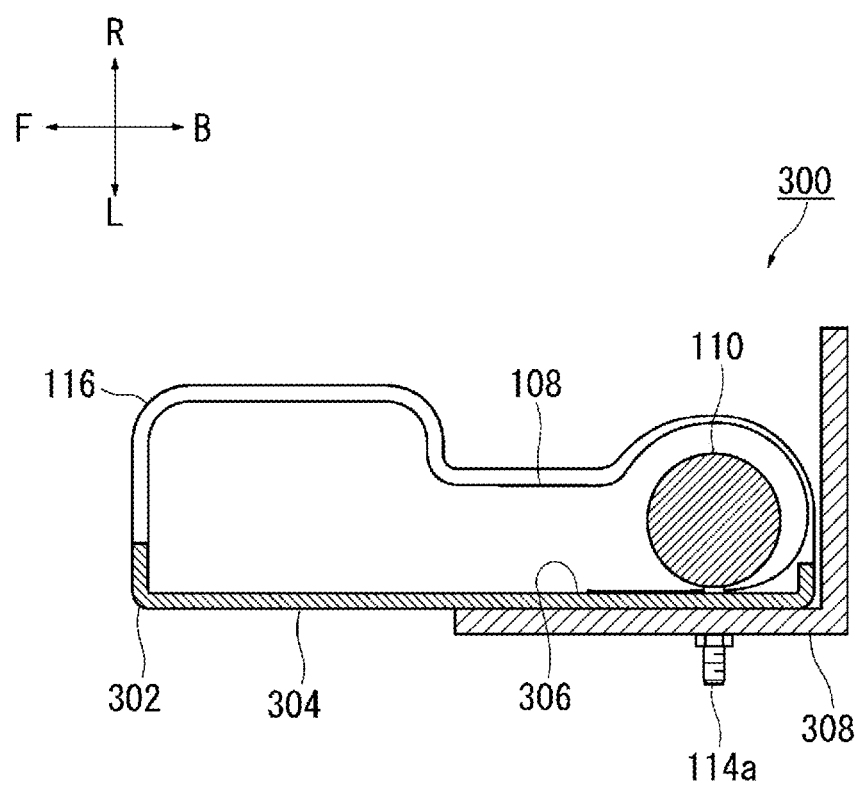
FIG. 6 is a view illustrating an example of a side airbag apparatus according to Embodiment 3 of the present invention.

FIG. 6 is a view illustrating an example of a side airbag apparatus 300 according to Embodiment 3 of the present invention. The side airbag apparatus is different from the abovementioned embodiments in terms of the shape of the holding plate.

In a holding plate 302, a side wall part 304 linearly extends from a base part 306. This side wall part 304 also supports the expanded and deployed cushion 108 from the side in front of a side frame 308 in the front-back direction. The holding plate 302 having this configuration can apply reaction force to the cushion 108 and increase the passenger restraining force of the cushion 108. Note that as in the abovementioned Embodiment 2, this holding plate 302 can also be attached to the side opposite the passenger of the side frame 308 together with the cushion 108 and the inflator 110.

Figure 7:
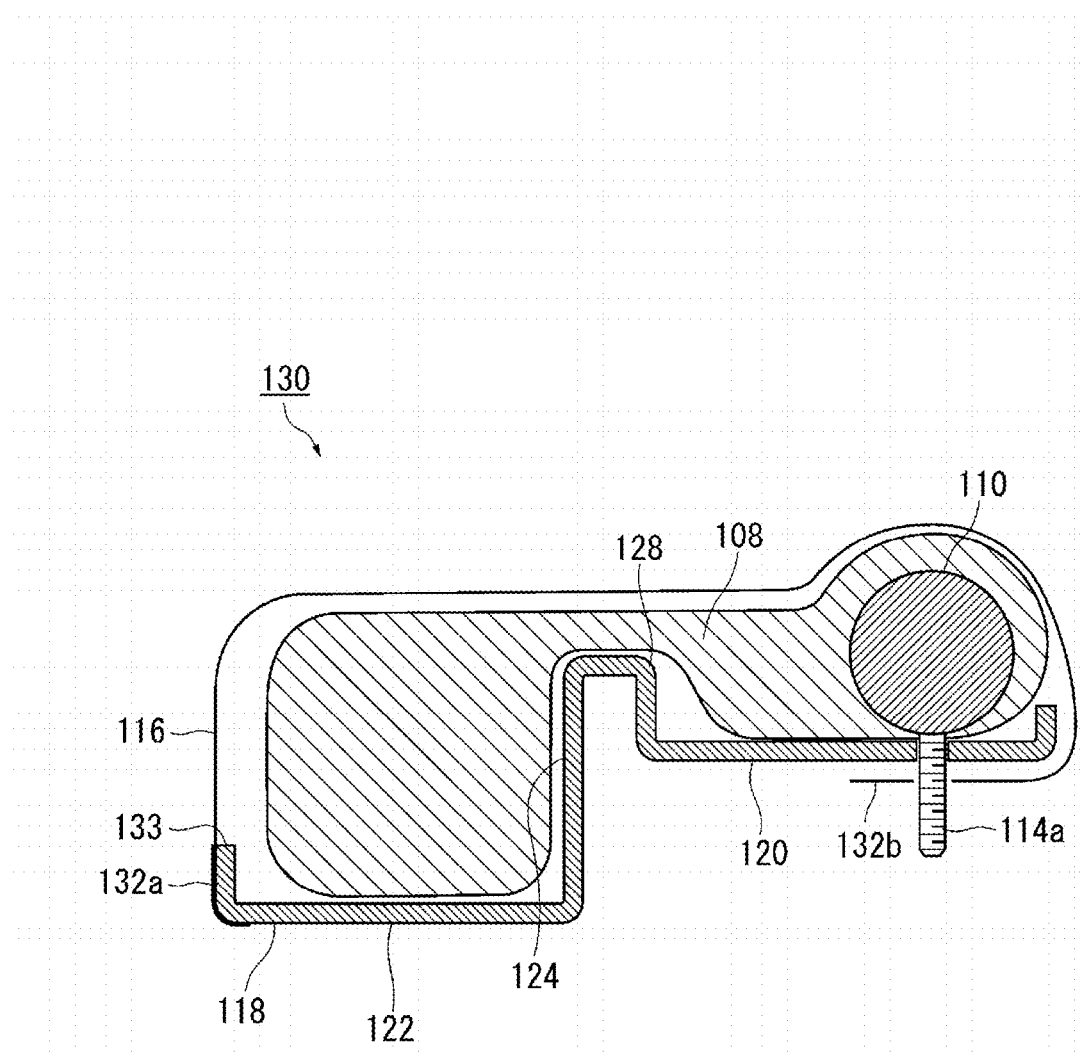
FIG. 7 is a view illustrating the cushion in the storage state and a holding plate in FIG. 3.

FIG. 7 is a view illustrating the cushion 108 in the storage state and the holding plate 118 in FIG. 3. The cover 116 according to the present embodiment is mainly made of a felt material including polymer fibers as a heat welding cloth. A rib 133 is formed at the front edge of the side wall part 122 of the holding plate 118. The rib 133 is bent from the side wall part 122 towards the passenger side and is useful in structure and manufacturing by, for example, ensuring rigidity. In the cover 116, the front end part 132a on the front side of the vehicle is welded in the vicinity of the rib 133 of this side wall part 122. A hole for allowing a bolt to pass through a predetermined region can be provided at the rear end part 132b on the rear side of the vehicle of the cover 116 so as to be hooked on a stud bolt 114a.

The cover 116 may be configured to cover the overall cushion 108 together with the holding plate 118 or may be configured to cover only a portion of the cushion 108. In any configuration, the cover 116 can suitably hold the cushion 108 in storage form, in addition to being able to handle the cushion 108, the inflator 110, and the holding plate 118 as a single whole structure (airbag module 130) even prior to installation at the side frame 112 (see FIG. 3) as well as following installation thereat.

The cover 116 is not limited to the heat welding cloth, but can be formed of the same material as the base cloth of the cushion 108, along with an unwoven fabric, etc. including various polymer fibers. Note that when the cover 116 is coupled to the holding plate 118, the cover 116 utilizing the heat welding cloth can be integrally coupled to the holding plate 118 via heat welding. In addition, irrespective of the material of the cover 116, the cover 116 can be coupled to the holding plate 118 by a method and timing (different from heat welding) such as the use of an adhesive and sewing.

Figure 8:
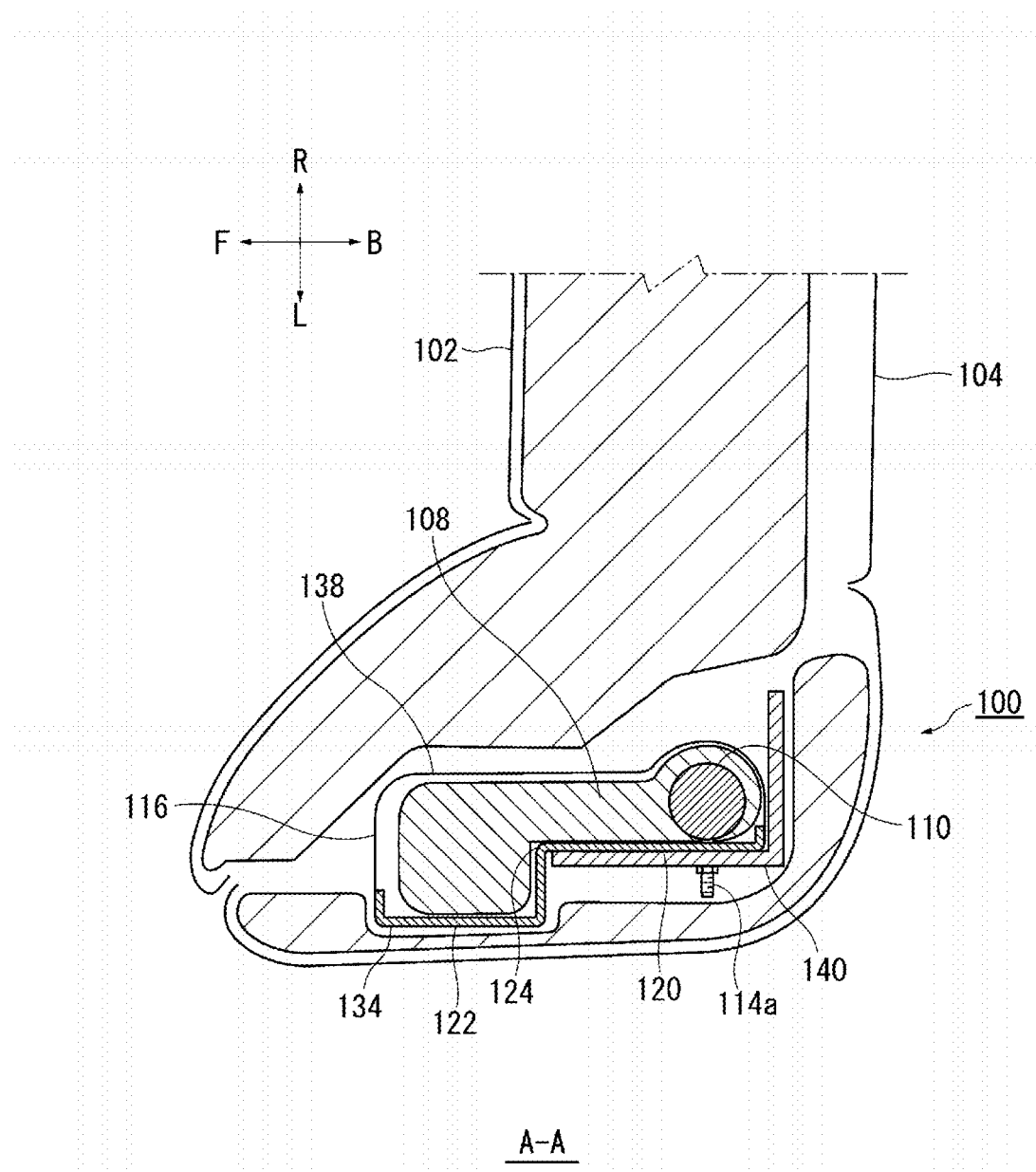
FIG. 8 is a view illustrating Modified Example 1 of the holding plate in FIG. 3.

FIG. 8 is a view illustrating Modified Example 1 of the holding plate 118 in FIG. 3. The front end part 128 (see FIG. 3) bent to the base part 120 is not provided in a holding plate 134 illustrated in FIG. 8, unlike the holding plate 118 in FIG. 3. Consequently, an airbag module 138 can be suitably attached to a flat side frame 140 free from the bent front edge 126 (see FIG. 3). Using a rear wall part 124 and the side wall part 122, even this holding plate 134 can support the cushion 108 from the rear side and side of the vehicle when the cushion 108 is expanded and deployed, while the cushion 108 can be rapidly expanded and deployed to improve passenger restraining force.

Figure 9:
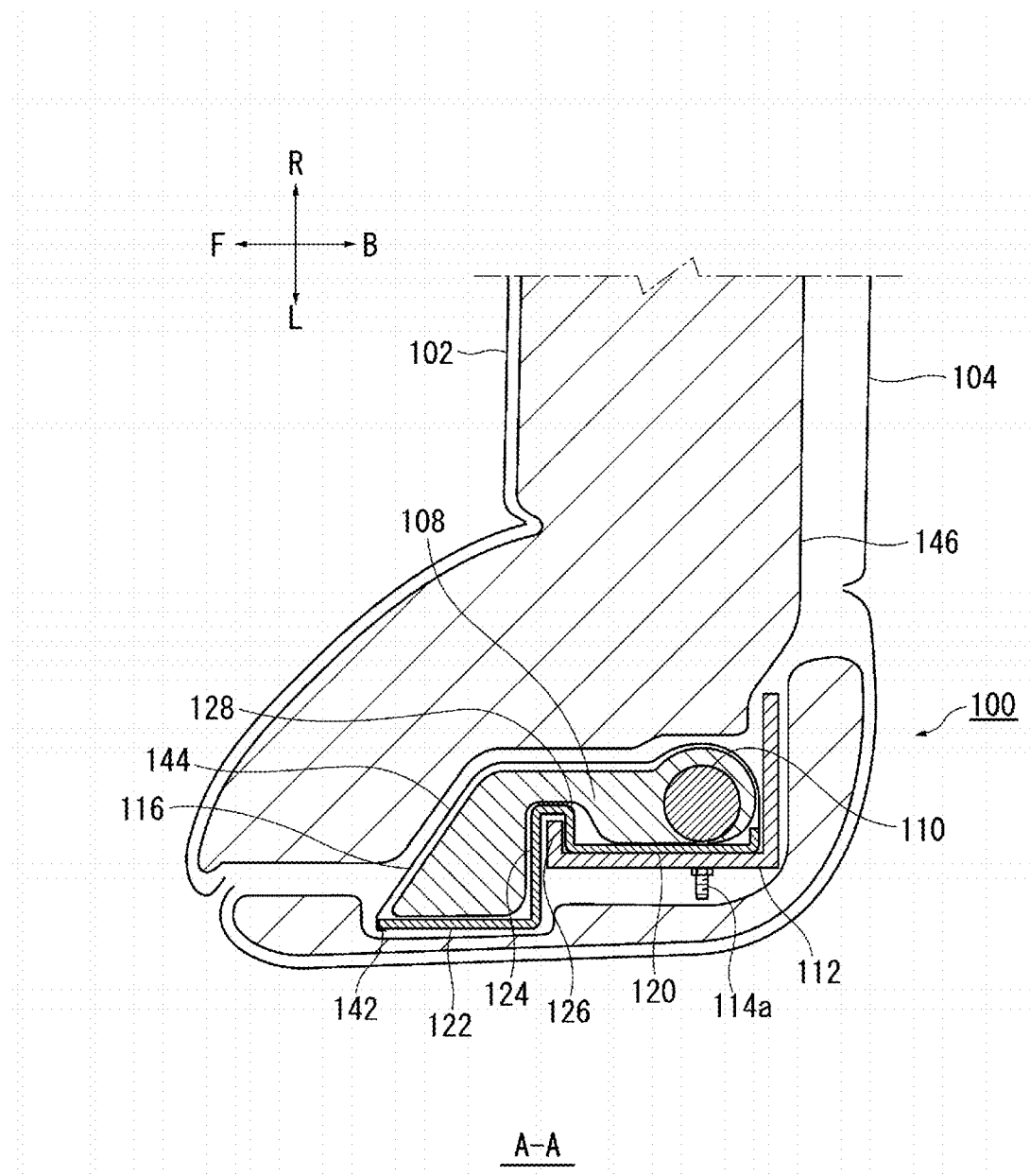
FIG. 9 is a view illustrating Modified Example 2 of the holding plate in FIG. 3.

FIG. 9 is a view illustrating Modified Example 2 of the holding plate 118 in FIG. 3. In a holding plate 142 illustrated in FIG. 9, unlike the holding plate 118 in FIG. 3, the rib 133 (see FIG. 7) at the front edge is omitted. This allows an airbag module 144 to be formed along the shape of a seat pad 146 (urethane material) of a seat 102.

The side wall part 122 of the holding plate 142 has no rib 133 (see FIG. 7) and therefore linearly extends from the rear wall part 124 towards the front edge on the front side of the vehicle. The cover 116 is coupled to the front edge of this linear side wall part 122. The cover 116 is formed of a material having a certain degree of flexibility, such as the same kinds of cloths as heat welding cloths, other unwoven fabrics, or the base cloths of the cushion 108. In addition, the holding plate 142 can be freely formed once the base part 120 and the side wall part 122 are ensured, such as omitting the rib 133 (see FIG. 7) and the front end part 128 (see FIG. 8). Consequently, even when the cushion 108 in storage form is formed so as to be appropriately deformable based on the internal shape of a seat pad 146 (for example, when the tip side of the cushion 108 is sloped so as to obtain a triangle in cross section) and the seat pad 146 is thick, an airbag module 144 can be efficiently installed in the narrow space inside the seat 102.

A preferred example of the present invention was described above while referring the accompanying drawings. However, while the embodiment described above is a preferred example of the present invention, other embodiments may be implemented or performed by various methods. In particular, unless described otherwise in the specification of the present application, the invention is not restricted to the shape, size, configurational disposition, and the like of parts illustrated in detail in the accompanying drawings. Furthermore, the expressions and terms used in the specification of the present application are used for providing a description, and thus the invention is not limited thereto, unless specifically described otherwise.

Therefore, it is obvious that a person with ordinary skill in the art could conceive of various changed examples or modified examples within the scope described in the scope of the claims, which is understood to naturally belong to the technical scope of the present invention.

INDUSTRIAL APPLICABILITY

The present invention can be used for a side airbag apparatus provided in a vehicle seat.

The invention claimed is:

1. A side airbag apparatus-; comprising:
an airbag cushion which is bag shaped, wound, or folded in a storage form;
a predetermined holding plate, the airbag cushion attached to the predetermined holding plate; and
an inflator embedded in the airbag cushion and for attachment to a side frame along a side of the seat back of a vehicle seat together with the airbag cushion and the holding plate;
wherein the holding plate includes:
a base part formed between the airbag cushion and the side frame; and
a side wall part which extends in a front-back direction of the vehicle in front of the side frame in the front-back direction of the vehicle and supports the expanded and deployed airbag cushion from a side, and
wherein:
the side wall part is disposed opposite the inflator in a left-right direction of the vehicle seat to the side frame, and the holding plate further includes a rear wall part disposed in front of the side frame and extending from the base part to the rear end of the side wall part, the holding plate for supporting expanded and deployed airbag cushion from a rear side of the vehicle.

2. The side airbag apparatus according to claim 1, wherein the side wall part linearly extends from the base part.

3. The side airbag apparatus according to claim 1, wherein the rear wall part and the base part sandwiching the side frame defines an angle of 90° or more.

4. The side airbag apparatus according to claim 1, wherein;
a front edge of the side frame is bent on the inflator side, and
the base part is bent so as to surmount the front edge of the side frame and be connected to the rear wall part.

5. The side airbag apparatus according to claim 3, wherein;
a front edge of the side frame is bent on an inflator side, and the base part is bent so as to surmount the front edge of the side frame and be connected to the rear wall part.

6. The side airbag apparatus according to claim 1, wherein the inflator is attachable to a passenger side of the side frame together with the airbag cushion and the holding plate.

7. The side airbag apparatus according to claim 2, wherein the inflator is attachable to a passenger side of the side frame together with the airbag cushion and the holding plate.

8. A side airbag apparatus, comprising:
an airbag cushion which is bag shaped, wound, or folded in a storage form;
a predetermined holding plate with the airbag cushion attached thereto; and
an inflator which is embedded in the airbag cushion and attachable to a side frame along a side of the seat back of a vehicle seat together with the airbag cushion and the holding plate;
wherein the holding plate includes:
a base part formed between the airbag cushion and the side frame; and
a side wall part which extends in a front-back direction of the vehicle in front of the side frame in the front-back direction of the vehicle and supports the expanded and deployed airbag cushion from a side, and
wherein the inflator is attached to a side opposite a passenger of the side frame together with the airbag cushion and the holding plate.

9. The side airbag apparatus according to claim 2, wherein the inflator is attached to a side opposite a passenger of the side frame together with the airbag cushion and the holding plate.

10. The side airbag apparatus according to claim 1, wherein the holding plate includes a part formed of resin.

11. The side airbag apparatus according to claim 2, wherein the holding plate includes a part formed of resin.

12. The side airbag apparatus according to claim 1, wherein the holding plate includes a part formed of metal.

13. The side airbag apparatus according to claim 2, wherein the holding plate includes a part formed of metal.

14. The side airbag apparatus according to claim 1, wherein the side airbag apparatus further includes a cover which releasably covers at least a portion of the airbag cushion in a storage form and is formed of a heat welding cloth.

15. The side airbag apparatus according to claim 2, wherein the side airbag apparatus further includes a cover which releasably covers at least a portion of the airbag cushion in a storage form and is formed of a heat welding cloth.

16. A side airbag apparatus, comprising:
an airbag cushion which is bag shaped, wound, or folded in a storage form;
a predetermined holding plate with the airbag cushion attached thereto; and
an inflator which is embedded in the airbag cushion and attachable to a side frame along the side of the seat back of a vehicle seat together with the airbag cushion and the holding plate;
wherein the holding plate includes:
a base part formed between the airbag cushion and the side frame; and
a side wall part which extends in a front-back direction of the vehicle in front of the side frame in the front-back direction of the vehicle and supports the expanded and deployed airbag cushion from a side,
wherein the holding plate has dimensions larger than that of the airbag cushion in storage form in the vertical direction.

17. The side airbag apparatus according to claim 2, wherein the holding plate has dimensions larger than that of the airbag cushion in storage form in the vertical direction.

* * * * *